Patented Feb. 26, 1929.

1,703,697

UNITED STATES PATENT OFFICE.

JOHN P. TRICKEY, OF EVANSTON, ILLINOIS, ASSIGNOR TO THE QUAKER OATS COMPANY, OF CHICAGO, ILLINOIS, A CORPORATION OF NEW JERSEY.

LACQUER SOLVENT.

No Drawing.     Application filed January 15, 1927. Serial No. 161,470.

This invention relates to solvents for cellulose derivatives, especially those applicable to the manufacture of lacquers and it relates particularly to compositions of matter comprising cellulose derivatives and these solvents.

In the manufacture of lacquers it has been found that no one solvent is satisfactory, but a mixture containing solvents of a relatively wide range of boiling points is necessary to impart the properties essential to a desirable lacquer. The evaporation rate should be fast at first and slow at the end, the slow evaporation at the end being important as the lacquer must have time to flow out and produce a smooth, uniform and glossy surface. The solvent must produce a solution of low viscosity even though the solution has become somewhat concentrated by evaporation.

The solvent should preferably have no objectionable odor and should be stable with respect to color and composition. It is especially important that the solvent should not decompose with the liberation of free acid or acidic compounds. The low boiling solvents are necessary to reduce the viscosity of the lacquers so they can be sprayed and since their rate of evaporation is high, they impart to the lacquers the property of quick drying. The high boiling solvents act as retarders to the drying of the lacquers, produce the final flow, giving a smooth, glossy film and prevent blushing.

It has also been common practice to add certain nonsolvents or diluents, such as the alcohols and the hydrocarbons which act as solvents for the gums and resins used in the preparation of lacquers, as well as to reduce the cost of the finished lacquer.

I have discovered that tetrahydrofurfuryl alcohol, which is one of the hydrogenation products of furfural, possesses many properties which makes its use in lacquers highly advantageous. I have found that tetrahydrofurfuryl alcohol is an excellent solvent for cellulose derivatives such as the cellulose esters and ethers, and that it is also a solvent for many of the gums and resins used in lacquers, such as gum guiac, gum mastic, ester gum, shellac and the like. It is also miscible with practically all the solvents and diluents at present in commercial use in the preparation of lacquers. I have also found that tetrahydrofurfuryl alcohol solutions of cellulose derivatives will stand relatively high dilution with the common diluents without precipitation of the cellulose derivatives.

As an illustration of the practice of this present invention a formula for lacquers comprising tetrahydrofurfuryl alcohol is given as follows; but it is not to be understood that I am to be limited to this specific formula.

Solids 20–30%.

| | Per cent. |
|---|---|
| Cellulose nitrate (R. S. cotton ½ sec.) | 40–60 |
| Ester gum | 20–30 |
| Dibutyl phthalate (plasticizer) | 20–40 |
| Pigment | 5–25 |

Liquids 70–80%.

| | Per cent. |
|---|---|
| Butanol (alcohol) | 5–15 |
| Butyl acetate (aliphatic ester) | 5–15 |
| Ethyl acetate (aliphatic ester) | 20–30 |
| Tetrahydrofurfuryl alcohol | 15–25 |
| Toluol (hydrocarbon) | 30–45 |

It is to be understood that the above formula is given only for illustrative purposes and that it represents but one of the various applications of tetrahydrofurfuryl alcohol as a solvent for cellulose derivatives. Neutrality, absence of objectionable odor, stability of color and wide range of solvent action, particularly adapt tetrahydrofurfuryl alcohol as an ingredient for the preparation of substantially all types of lacquers.

Of course, it will be observed that tetrahydrofurfuryl alcohol may be used alone as the sole solvent in the making of lacquers, particularly where slow drying is desired. Under such circumstances, other lacquers, solvents, excepting the tetrahydrofurfuryl alcohol, may be dispensed with whereupon the tetrahydrofurfuryl alcohol will be the sole solvent for the cellulose derivatives, gums, plasticizers and the like.

Because of the solvent action of tetrahydrofurfuryl alcohol on gums, resins, plasticizers and the like and because of its complete miscibility with other alcohols and with benzene, toluene and gasoline, it acts as a highly efficient blending agent, prevents blushing of the lacquer and produces a clear, smooth film of high luster.

The use of tetrahydrofurfuryl alcohol as a high boiling solvent is highly advantageous. It is stable and water white in color, thereby being applicable to clear and light colored lacquers. It is practically odorless, this property being of great importance in the preparation of lacquers intended for application in enclosed space as the high boiling solvents are the last solvents evaporated from the lacquer film and consequently an objectionable odor would render their use undesirable.

Whereas cellulose nitrate has been employed in the illustrative formula cited, other formulæ could be given in which cellulose acetate and other cellulose derivatives, such as the cellulose ethers, could be used which are applicable to the preparation of lacquers.

While I have described my invention in one of its forms, it is understood that I do not desire to be limited to any of the specific details outlined above other than those pointed out in the appended claims.

I claim:

1. A composition of matter comprising a cellulose derivative dissolved in tetrahydrofurfuryl alcohol.

2. A composition of matter comprising a cellulose ester dissolved in tetrahydrofurfuryl alcohol.

3. A composition of matter comprising cellulose nitrate dissolved in tetrahydrofurfuryl alcohol.

4. A composition of matter comprising a cellulose derivative, and a solvent mixture therefor comprising tetrahydrofurfuryl alcohol and a diluent for said solvent mixture.

5. A composition of matter comprising a cellulose ester, a solvent mixture therefor comprising tetrahydrofurfuryl alcohol and a diluent for said solvent mixture.

6. A composition of matter comprising cellulose nitrate, a solvent mixture therefor comprising tetrahydrofurfuryl alcohol and a diluent for said solvent mixture.

7. A composition of matter comprising a cellulose derivative and a gum dissolved in a solvent mixture therefor comprising tetrahydrofurfuryl alcohol.

8. A composition of matter comprising a cellulose ester and a gum dissolved in a solvent mixture therefor comprising tetrahydrofurfuryl alcohol.

9. A composition of matter comprising cellulose nitrate and a gum dissolved in a solvent mixture therefor comprising tetrahydrofurfuryl alcohol.

10. A composition of matter comprising a cellulose derivative, a gum dissolved in a solvent mixture comprising tetrahydrofurfuryl alcohol and a diluent for said solvent mixture.

11. A composition of matter comprising a cellulose ester, a gum dissolved in a solvent mixture comprising tetrahydrofurfuryl alcohol and a diluent for said solvent mixture.

12. A composition of matter comprising cellulose nitrate, a gum dissolved in a solvent mixture comprising tetrahydrofurfuryl alcohol and a diluent for said solvent mixture.

13. A composition of matter comprising a cellulose derivative, a gum, and a plasticizer dissolved in a solvent comprising tetrahydrofurfuryl alcohol.

14. A composition of matter comprising a cellulose ester, a gum, and a plasticizer dissolved in a solvent comprising tetrahydrofurfuryl alcohol.

15. A composition of matter comprising cellulose nitrate, a gum, and a plasticizer dissolved in a solvent comprising tetrahydrofurfuryl alcohol.

16. A lacquer comprising a cellulose derivative, a gum, and a plasticizer dissolved in a solvent mixture therefor including tetrahydrofurfuryl alcohol and a diluent for said solvent mixture.

17. A lacquer comprising a cellulose ester, a gum, and a plasticizer dissolved in a solvent mixture therefor including tetrahydrofurfuryl alcohol and a diluent for said solvent mixture.

18. A lacquer comprising cellulose nitrate, a gum, and a plasticizer dissolved in a solvent mixture therefor including tetrahydrofurfuryl alcohol and a diluent for said solvent mixture.

19. A cellulose ester composition containing tetrahydrofurfuryl alcohol and a resin.

20. A cellulose ester composition containing tetrahydrofurfuryl alcohol, a resin, and a solvent softener.

In witness whereof, I have hereunto subscribed my name.

JOHN P. TRICKEY.